United States Patent
Kirschey

Patent Number: 5,489,240
Date of Patent: Feb. 6, 1996

[54] JOINT COUPLING

[75] Inventor: Gerhard Kirschey, Wuppertal, Germany

[73] Assignee: Centa-Antriebe Kirschey GmbH, Haan, Germany

[21] Appl. No.: 98,392

[22] PCT Filed: Nov. 17, 1992

[86] PCT No.: PCT/DE92/00974

§ 371 Date: Aug. 4, 1993

§ 102(e) Date: Aug. 4, 1993

[87] PCT Pub. No.: WO93/11988

PCT Pub. Date: Jun. 24, 1993

[30] Foreign Application Priority Data

Dec. 16, 1991 [DE] Germany ............ 41 41 520.5

[51] Int. Cl.⁶ .................................................. F16D 3/60
[52] U.S. Cl. ................................................ 464/69; 464/147
[58] Field of Search .................................. 464/69, 81, 84, 464/100, 101, 147

[56] References Cited

U.S. PATENT DOCUMENTS

| | | |
|---|---|---|
| 2,630,692 | 3/1953 | Naugler ............ 464/69 |
| 4,385,893 | 5/1983 | Kirschey . |
| 4,428,738 | 1/1984 | Loubier ............ 464/93 |
| 4,460,345 | 7/1984 | Chivari ............ 464/147 |
| 4,661,084 | 4/1987 | Federn ............ 464/100 |
| 4,664,642 | 5/1987 | Kirschey . |

FOREIGN PATENT DOCUMENTS

| | | |
|---|---|---|
| 3049054 | 7/1982 | Germany . |
| 40211125 | 4/1990 | Japan ............ 464/100 |
| 1210204 | 10/1970 | United Kingdom . |

*Primary Examiner*—Daniel P. Stodola
*Assistant Examiner*—Eileen A. Dunn
*Attorney, Agent, or Firm*—Herbert Dubno

[57] ABSTRACT

A coupling to balance radial movement and axial displacement between a first and second half-coupling, with an unsupported intermediate member which is connected via two connecting rods with the first half-coupling on one side and via another two connecting rods with the second half-coupling, the intermediate member consisting of two releasably interconnected arc-shaped half-members (11,12), the end sections of the half-members (11,12) overlap at the periphery and are held together in the two overlap regions (19) by two aligned axial drillings (15,17) to take the bolts (29,30,35,36) securing the connecting rods. In addition, each half-member (11,12) is cut from sheet-steel and at least both their two end sections are arranged in the same plane. This provides a heavily loadable coupling with extremely simply made half-members (11,12) which can easily be fitted and dismantled.

6 Claims, 7 Drawing Sheets

JOINT COUPLING

CROSS REFERENCE TO RELATED APPLICATIONS

This application is a national phase of PCT/DE92/00974 filed Nov. 17, 1992 and based, in turn, upon German national application P 41 41 520.5 filed Dec. 15, 1991 under the International Convention.

FIELD OF THE INVENTION

The invention relates to a coupling for balancing the radial movements and axial displacement between a first coupling half and a second coupling half with an unsupported intermediate member which is connected by means of two connecting rods with the first coupling half on the one side and by a further two connecting rods with the second coupling half on the other side whereby the intermediate member consists of two ark-shaped detachably interconnected intermediate member halves.

A coupling of the type described above is known for instance from DE-OS 30 49 054. As described therein, it serves particularly for the transmission of the motor output of an electrically driven rail vehicle from a first flange of a hollow shaft to a second flange of a drive axle enclosed by the hollow shaft and radially movable relative thereto. For this purpose a four-member linkage is formed by the first flange, the first pair of connecting rods and the intermediate member as the driving first coupling half, and a second four-member linkage is formed by the intermediate member, the connecting rods and the second flange as the driven second coupling half. The intermediate member consists of two arc-shaped halves divided in transverse direction with respect to its axis, which are releasably connected by two screws arranged approximately tangentially. This makes possible to fit the intermediate member and the connecting rods later or to dismantle them. However this is quite cumbersome. Besides the known coupling has a relatively expensive construction, particularly in with respect to the intermediate member.

OBJECT OF THE INVENTION

It is therefore the object of the invention to provide a coupling of the aforedescribed type, which can be fitted and dismantled more easily, and has a considerably simpler configuration of the intermediate element.

SUMMARY OF THE INVENTION

This object is achieved, in accordance with the invention, in a coupling of the type described in which the intermediate member halves overlap each other peripherally with their end sections and are held together in each of the two overlap regions by two aligned axial bores receiving bolts securing the connecting rods. Each of the intermediate member halves is cut out from sheet metal and at least the two end sections of each intermediate member half are located in a common plane.

Advantageously, the intermediate member halves are cut out from sheet steel or sheet titanium. The intermediate member halves can have at least one additional overlapping area at which they are detachably interconnected. The connecting rods can be forked in the areas adjoining the intermediate member and the intermediate member can be received between arms of the forks.

According to the invention, the connecting rods can be shaped without forks and a pair of the intermediate member halves can be arranged in front of the axially oriented outer sides of the connecting rods.

Inner areas of the intermediate member halves of at least one of two intermediate members can be bent toward each other out of the plane of the respective end sections. The inner areas of the intermediate member halves can be so formed that they can touch each other and be detachably interconnected where they are in common contact.

According to the invention the bolts attaching the connecting rods to the intermediate member serve at the same time for the mutual connection of the intermediate member halves. Compared to the state of the art, the two special screws, as well as all steps and arrangement for their fitting and handling, are eliminated. But most important is the configuration of the intermediate member halves, which are designed so that both end sections of an intermediate member half are in parallel planes but closely adjoin one another. This namely makes it possible to keep each of the intermediate member halves free of maximum torque, at least in the areas where they are linked to the bolts and to cut them out of sheet metal, especially steel or titanium sheet. In this way the entire intermediate member can still have sufficient strength from every point of view and at the same time be rationally produced from moderately priced materials, and primarily in a cost-effective manner, such as by stamping, sawing, spark erosion, laser or water-jet cutting. Besides, only a very small axial installation space between the two coupling halves is required. By comparison, the known intermediate member having multiple forks to accommodate the connecting rods and requiring a great deal of space, could be functionally built only as an expensive cast steel piece or a forged piece.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
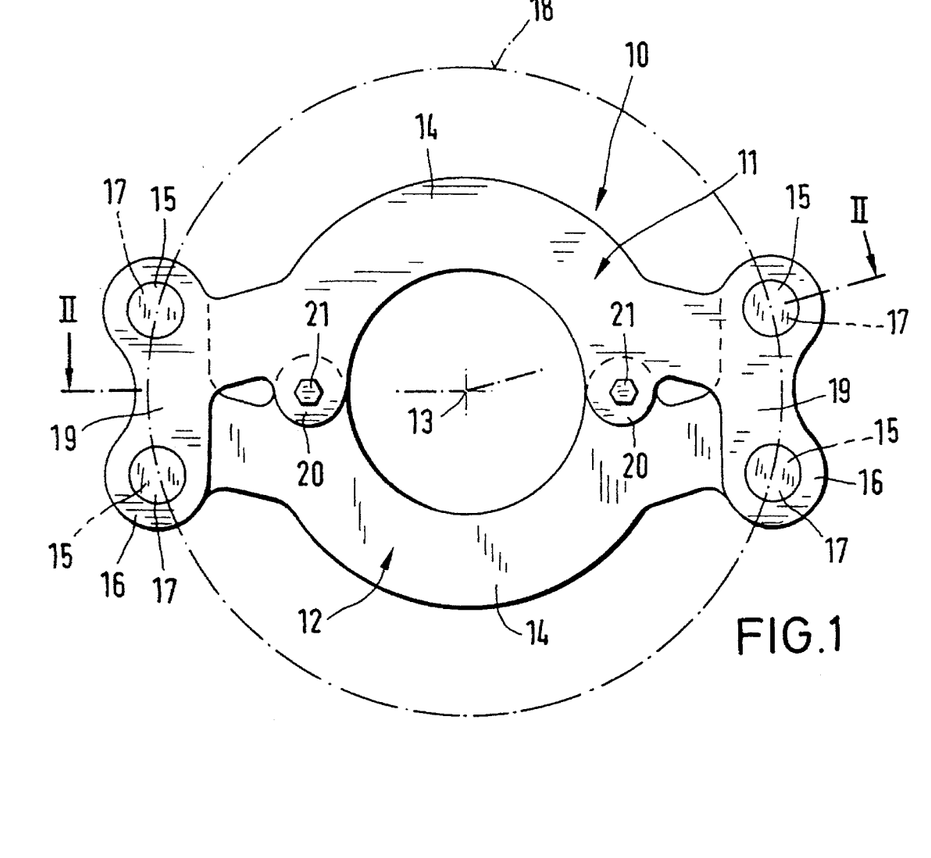
FIG. 1 is an elevational view of an intermediate member used in the coupling of the invention.

In FIG. 1 the intermediate member generally marked 10 consists of two identical intermediate member halves 11 and 12. Each intermediate member is basically arc-shaped around the central axis 13 of a coupling arrangement to be described later. In the proximity of its arc-shaped main part 14, each intermediate member half 11, 12 has in the area of its outer ends a bore 15, as well as a second bore 17 at the end of an extended segment 16. Each of the two bores 15, 17 of the one intermediate member half 11 is located within a corresponding overlapping 19 with the second intermediate member half 12 in axial alignment with the corresponding bores 17 and 15 of this second coupling half 12. All bores 15, 17 of the two intermediate member halves 11 and 12 thereby lie on a common pitch circle marked 18.

The two intermediate member halves 11 and 12 opposingly positioned one above the other corresponding to FIG. 1, but identical to each other, have in addition further inwards in radial direction two further overlapping areas 20, wherein they are detachably fastened to each other by bolts 21. The bolts serve for attaching the intermediate member halves 11 and 12 cut out of fairly thin sheet metal to each other, in order to reinforce the intermediate member arrangement with regard to its rigidity and buckling strength.

Figure 3:
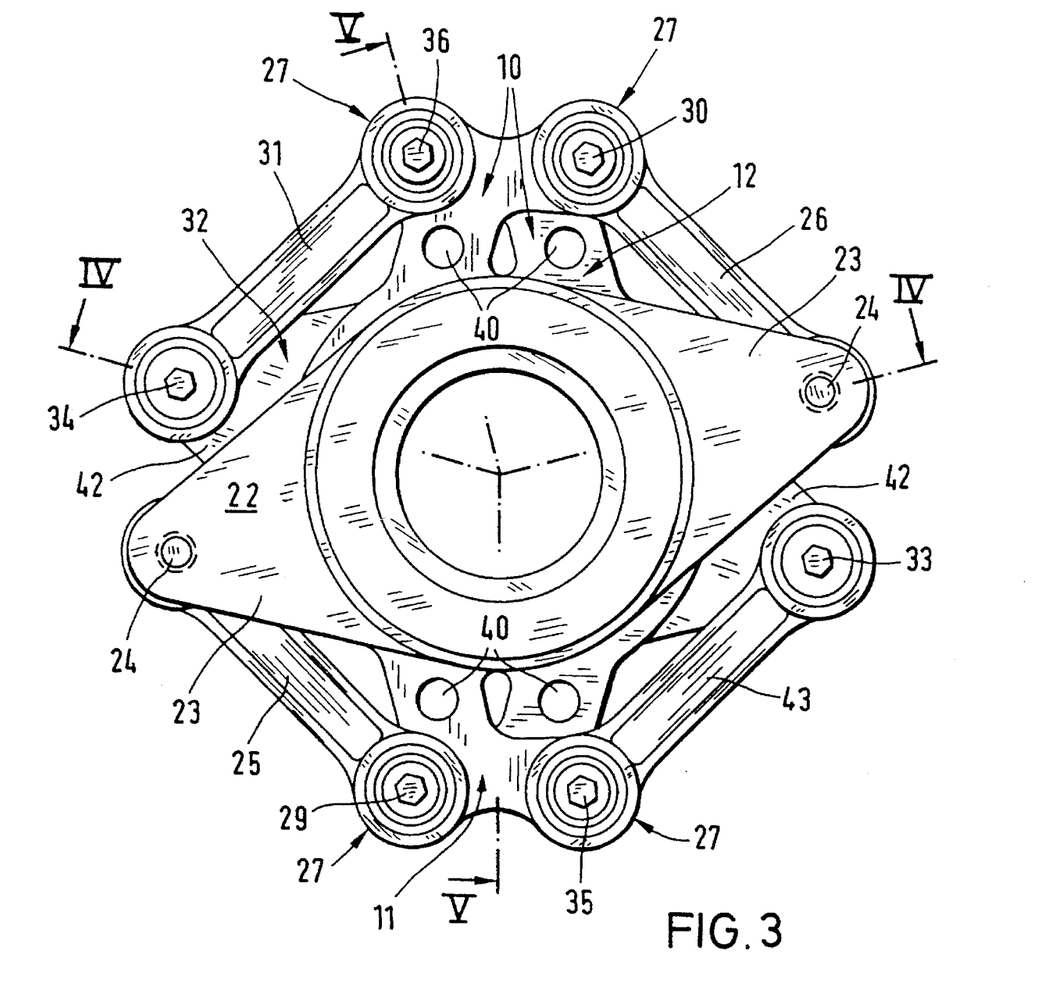
FIG. 3 is a plan view of a coupling seen in its axial direction.
Figure 4:
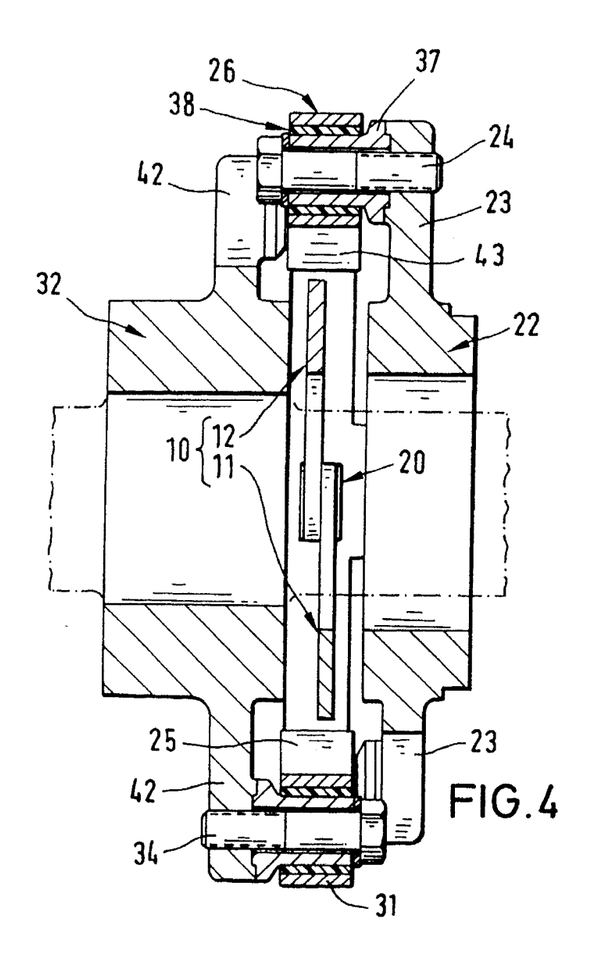
FIG. 4 is a section taken along line IV—IV in FIG. 3.
Figure 5:
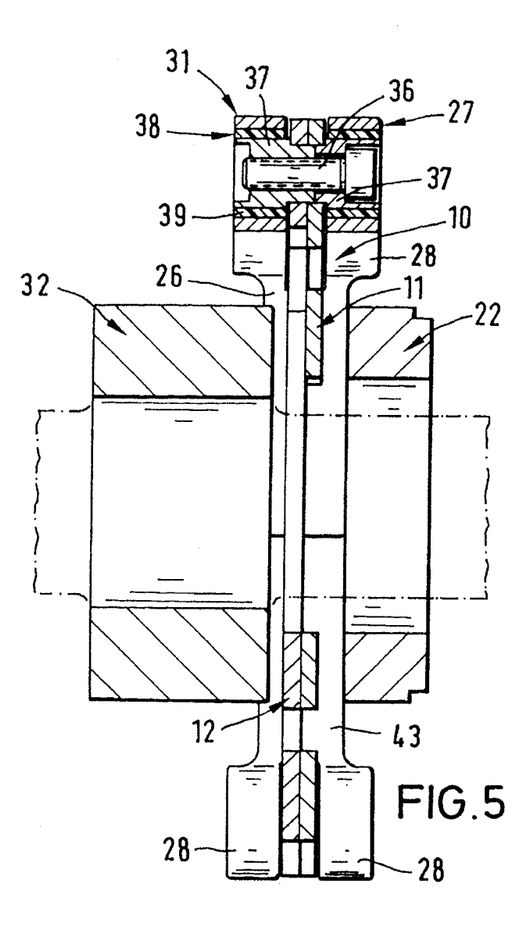
FIG. 5 is a section along line V—V in FIG. 3.

In FIG. 3 the intermediate member halves 11 and 12 are shown built into a coupling. To the first coupling half 22 (FIGS. 4 and 5) connecting rods 25, 26 are linked to respective radial projections 23 of the coupling half 22 by means of bolts 24. Each of these two connecting rods 25, 26 has at its other end a fork 27 whose fork arms 28 grip the respective intermediate member 10 formed by the two intermediate halves 11 and 12. The threaded bolt 29 reaches through the intermediate member half 11 through its inner bore 15 and the intermediate member half 12 through its outer bore 17 (FIG. 3). Correspondingly the bolt 30 assigned to connecting rod 26 traverses the outer bore 17 of the intermediate member half 11 and the further inwards located bore 15 of the second intermediate member half 12 which the intermediate member half 11 overlaps areawise axially and basically radially. In a corresponding arrangement two further connecting rods 43 and 31 lead from linking points on the intermediate member 10 marked by bolts 35 and 36 to the second coupling half 32 (FIGS. 4 and 5). The connecting rods 43 and 31 are linked thereto by means of bolts 33 and 34 at arms 42 of this second coupling part 32.

Figure 2:
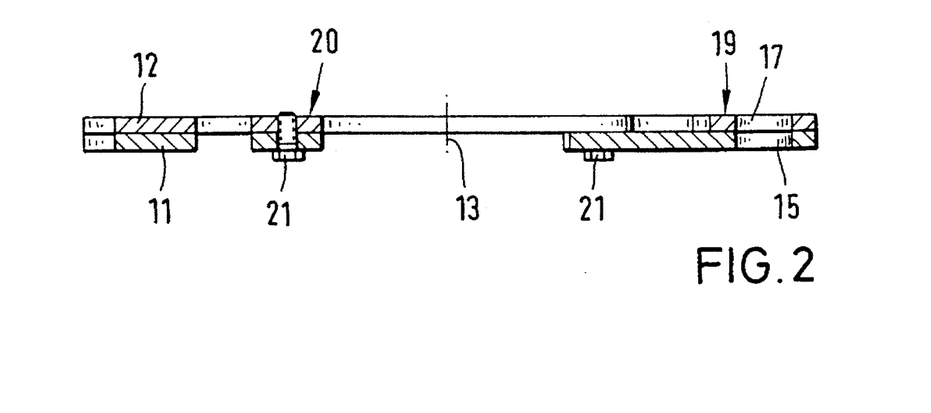
FIG. 2 is a longitudinal section taken along section line II—II in FIG. 1.

Each of bolts 29, 43, 35 and 36 thus serves also for linking the respective connecting rods 25, 26, 43 and 31 to the intermediate member, whereby as a result the intermediate member halves 11, 12 themselves are connected to each other without requiring special screw connections. The special screw connections 21 corresponding to FIG. 1 and 2 do not have to be provided in the case of particularly thick intermediate member halves. They have the purpose to increase the rigidity, particularly the buckle resistance of the intermediate member. As a result of the additional connections between the two intermediate member halves 11 and 12 with the screws 21, the intermediate member halves can be made of thinner sheet metal than would be possible without this connection.

As shown in FIGS. 4 and 5, the arrangement requires only very little axial installation space between the coupling halves 22 and 32.

Figure 6:
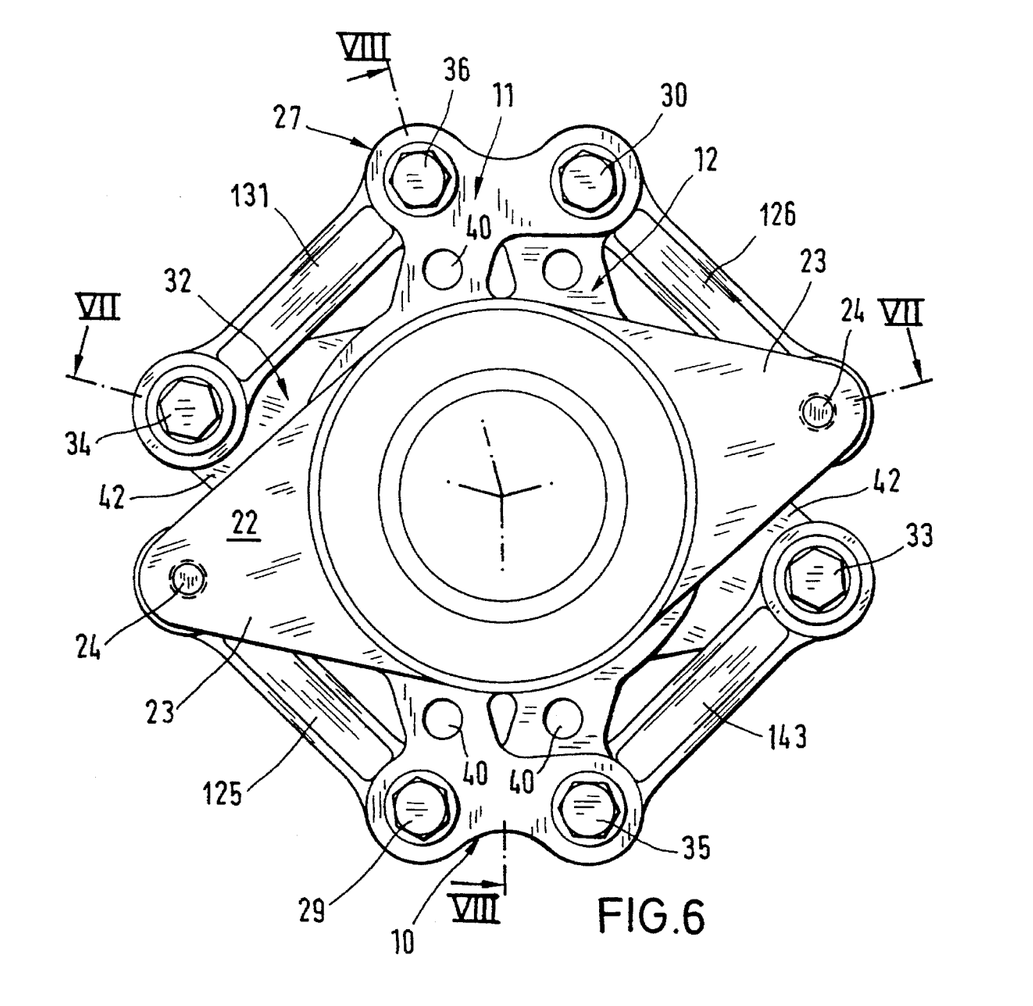
FIG. 6 is a view corresponding to FIG. 3 of a second coupling embodiment.
Figure 7:
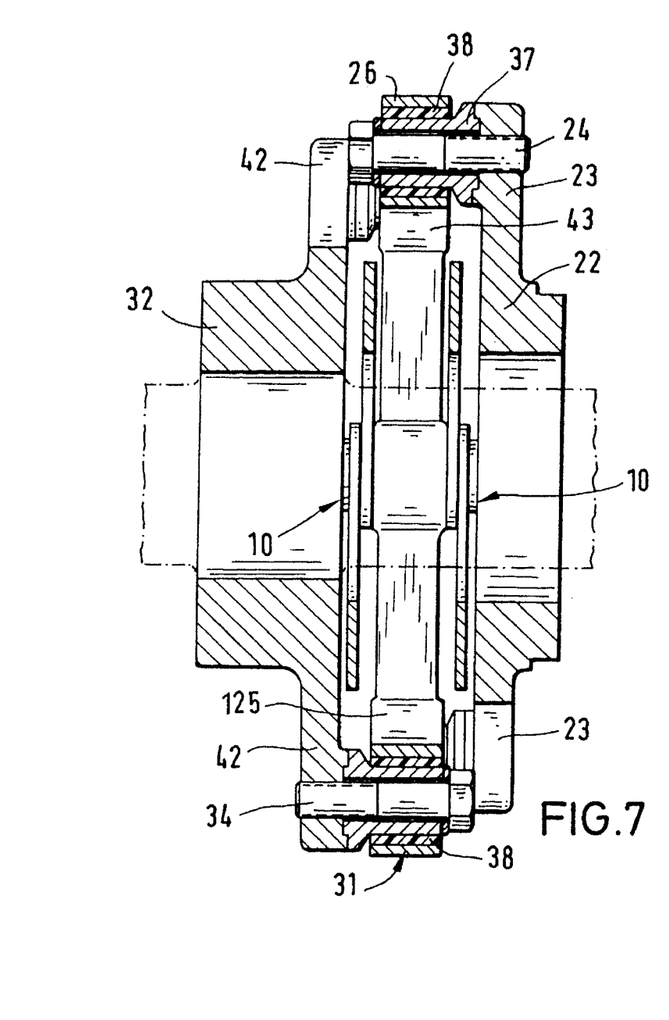
FIG. 7 is a section along line VII—VII in FIG. 6.
Figure 8:
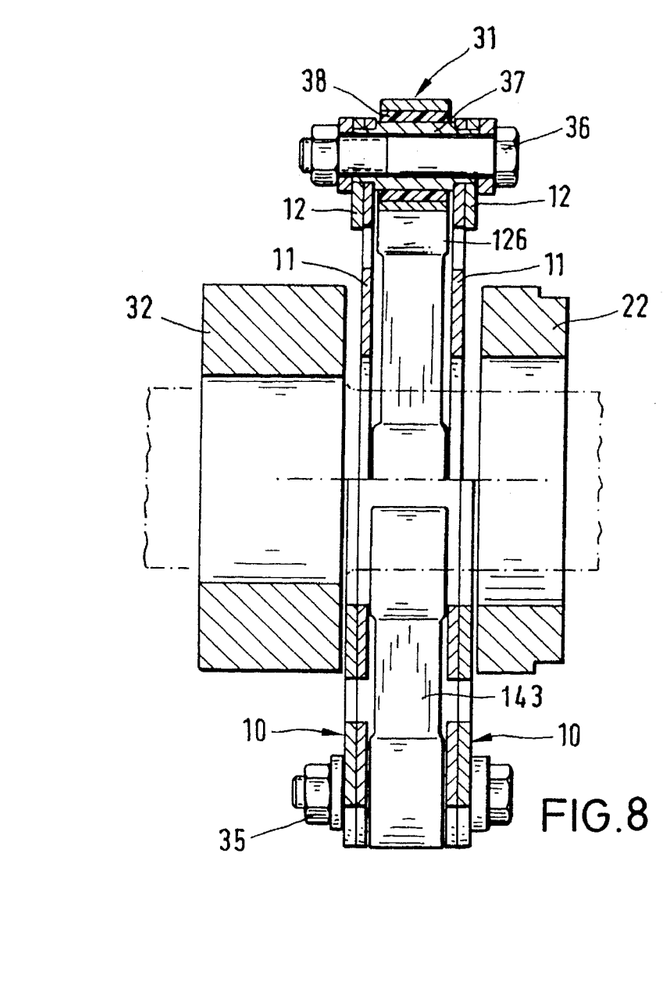
FIG. 8 is a section along line VIII—VIII in FIG. 6.

A second embodiment is shown in FIGS. 6 to 8 and uses two intermediate members 10 of the aforedescribed kind, each in turn consisting also of two identical intermediate member halves 11 and 12. This embodiment has basically two advantages. On the one hand it does not require connecting rods 125, 126, 131, 143 forked at least at one end. On the other hand the buckling resistance of the intermediate members 10 is increased by the double arrangement, so that the coupling can absorb higher loads and/or the intermediate member can be made even thinner.

While the embodiment according to FIGS. 6 to 8 with fully plane intermediate members requires somewhat more axial installation space than the embodiment according to FIGS. 3 to 5, FIGS. 9 and 10 show an embodiment with two intermediate members 10 which differ from the ones in FIGS. 6 to 8 in that they are formed to reach towards each other in their middle areas. Within this area of mutual contact of the two intermediate members 10 of the coupling, these—namely all four intermediate members halves 11, 12 are connected to each other through a detachable connection, particularly a screw connection In all embodiments the reference numerals 37 marks flange bushings traversed by the mentioned bolts, adjusted to the respective conditions. Each supports sleeve-like rubber-metal elements 38, each consisting of two thin steel bushings with an elastic rubber inlay 39, connected by vulcanization. Thereby each rubber-metal element 38 is radially prestressed and pressed onto the pertaining flange bushing 37. The respective radially prestressed connecting rods are also pressed with their pertaining link eyes onto the outer shell of the respective rubber-metal element. This way a relative rotation between the flange bushing and connecting rod about the axis of a bolt takes place due to the elastic deformation of the shell-like rubber element. Besides the rubber element allows to a certain extent cardanic movements, i.e. tilting motions, which occur because of the angular offset of the two coupling halves 22 and 32.

For clarification's sake it has to be mentioned that the perforations marked 40 in the intermediate member halves 11, 12 have the purpose of weight reduction.

The fitting and dismantling of the couplings equipped with the intermediate member halves according to the invention are very simple. In the case of dismantling this is accomplished by releasing the respective bolts, whereby the connecting rods can be separated from the coupling halves, without having to axially remove the coupling halves 22 and 32 from each other.

Figure 9:
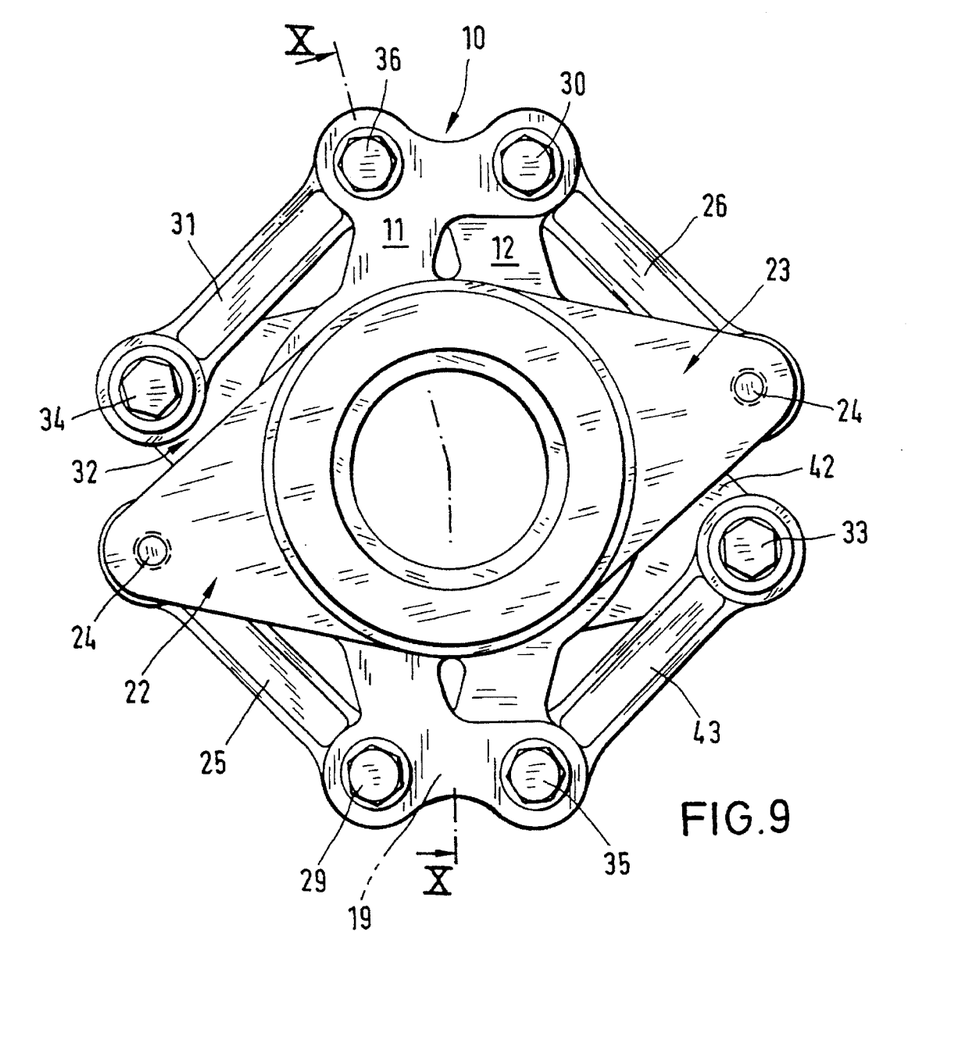
FIG. 9 is a view of a third embodiment of a coupling.
Figure 10:
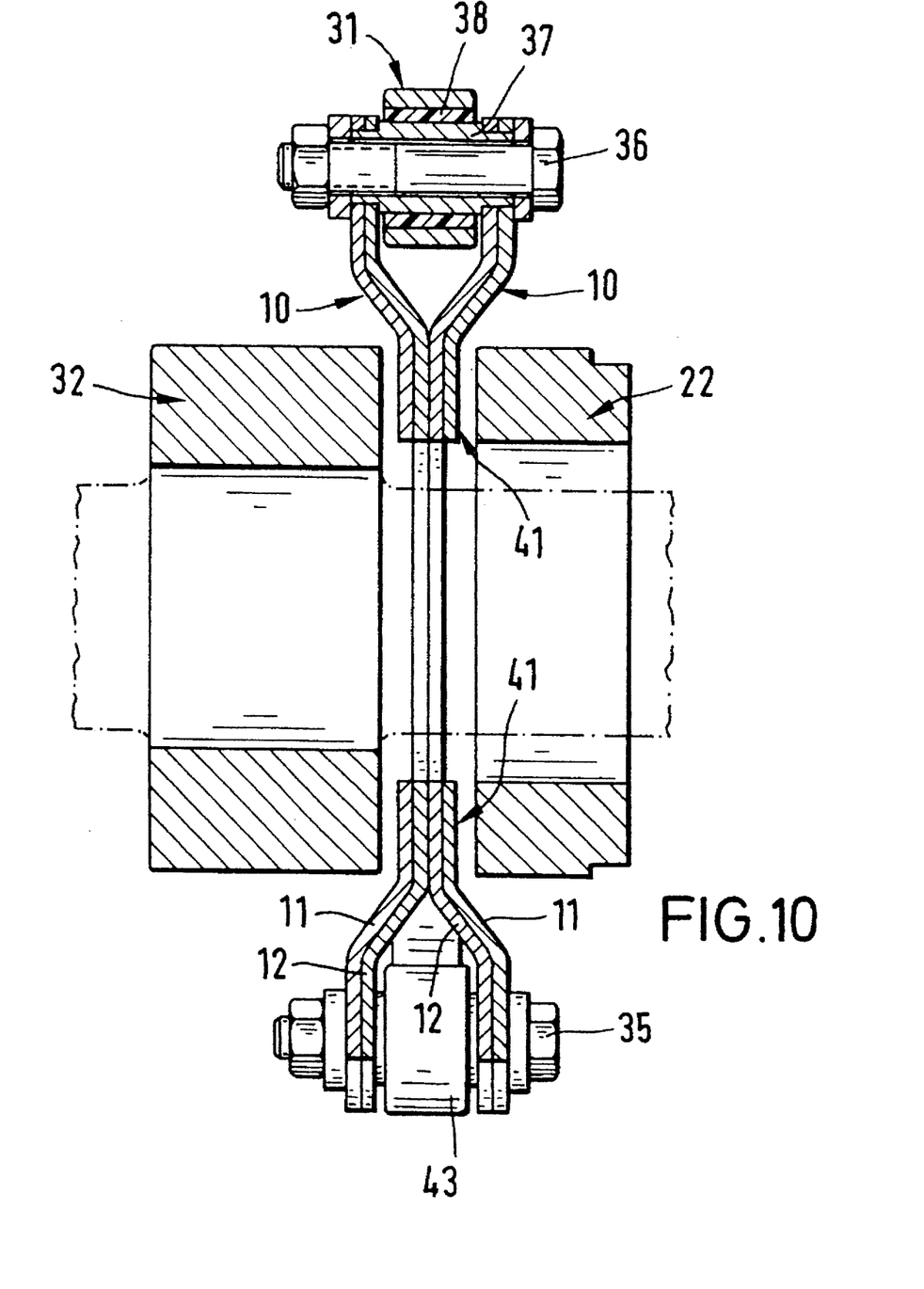
FIG. 10 is a section along line X—X in FIG. 9.

As can be seen from FIGS. 9 and 10, the inner areas of the intermediate member halves 11, 12 can be bent inwardly toward one another and the inner areas of two members 10 can lie in contact with one another.

I claim:

1. A coupling for compensating radial and axial movements, comprising:

a first coupling half and a second coupling half axially spaced from one another and located along a common axis;

an intermediate member disposed between said coupling halves, said intermediate member consisting of:
two sheet metal substantially identical intermediate member halves,
each of said intermediate member halves having an arcuate central portion and arms extending in opposite directions from said central portion,
each of said arms is formed with a respective end section having a first bore, a transverse extension, and a second bore in said extension,
the end sections of each intermediate member half lie in a common plane, and
the intermediate member halves are oriented oppositely and lie against one another with the respective end sections over-lapping and being flush with one another at said extensions and the first bores of one of said intermediate member halves are aligned with the second bores of the other of said intermediate member halves to form respective pairs of aligned bores of the intermediate member at respective ends thereof; and respective connecting rods connecting said intermediate member with said coupling halves, said connecting rods including:
- a pair of opposite connecting rods having bolts each traversing one pair of aligned bores at one of said ends of said intermediate member and pivotally connected to one of said coupling halves, and
- another pair of opposite connecting rods having bolts each traversing another pair of aligned bores at another of said ends of said intermediate member and pivotally connected to the other of said coupling halves, said bolts holding said intermediate member halves together.

2. The coupling defined in claim 1 wherein said intermediate member halves are composed either of sheet steel or sheet titanium.

3. The coupling defined in claim 1 wherein said intermediate member halves further have overlapping regions between their end sections, further comprising means for connecting said overlapping regions together.

4. The coupling defined in claim 1 wherein said connecting rods have forks at ends of said rods connected to said intermediate member, said forks having fork arms straddling said intermediate member.

5. The coupling defined in claim 1 wherein said coupling has two of said intermediate members and said connecting rods lie between said intermediate members.

6. The coupling defined in claim 5 wherein said central portion of the intermediate member halves of at least one of said intermediate members are bent toward the other of said intermediate members out of the planes of the respective end sections.

* * * * *